(No Model.)

J. MORTON.
WATER WHEEL GOVERNOR.

No. 269,594. Patented Dec. 26, 1882.

WITNESSES.

INVENTOR.

James Morton
by Joseph A. Miller & Co.
Att'ys

UNITED STATES PATENT OFFICE.

JAMES MORTON, OF NORWICH, CONNECTICUT.

WATER-WHEEL GOVERNOR.

SPECIFICATION forming part of Letters Patent No. 269,594, dated December 26, 1882.

Application filed September 26, 1882. (No model.)

*To all whom it may concern:*

Be it known that I, JAMES MORTON, of Norwich, in the county of New London and State of Connecticut, have invented a new and useful Improvement in Governors for Water-Wheels; and I hereby declare that the following is a full, clear, and exact description of the same, reference being had to the accompanying drawings, forming part of this specification.

The invention has reference to an improvement in mechanism for controlling the water-supply to water-wheels, and is particularly designed for use in cotton, woolen, and other mills, where it is of the highest importance to run the machinery at as nearly a uniform rate as possible.

In the water-wheel governors as heretofore constructed a centrifugal governor provided with weighted arms has been connected with a driven shaft, so as to revolve at a high rate of speed, the variations of speed changing the position of the arms by the increase or decrease of the speed at which they moved. This motion of the arms has been in all cases used to operate the gate by connecting a compound gear at one or the opposite side, by means of a clutch, with a driven shaft, and thus communicate motion to the gate-shaft, to either open or close the gate as the change in speed required; or continuously-reciprocating pawls were allowed to enter a rack, so as to propel the same in one or the opposite direction by a shield or plate on which the pawls could slide and be kept from contact with the teeth of the rack; or by similar devices which either required that the centrifugal governor should exert considerable force, and thereby prevent the free action of the governor, or it required considerable time to change the gate-opening sufficiently to affect the speed.

The object of this invention is to produce a much more sensitive water-wheel governor, by which any variation of the speed will be quickly corrected, and in which the gate will be moved quickly by fixed gears in either direction to regulate the speed of the water-wheel.

The invention consists in the peculiar and novel construction and combination of the parts, by which the arms of the constantly-driven governor operate a clutch for connecting a compound gear with a constantly-driven shaft, and through the same move a constantly-driven belt from a central pulley on one or the other of two pulleys placed on each side of the central pulley, and thereby, through fixed gears, operate the gate and change the speed quickly, as will be more fully set forth hereinafter.

Figure 1:
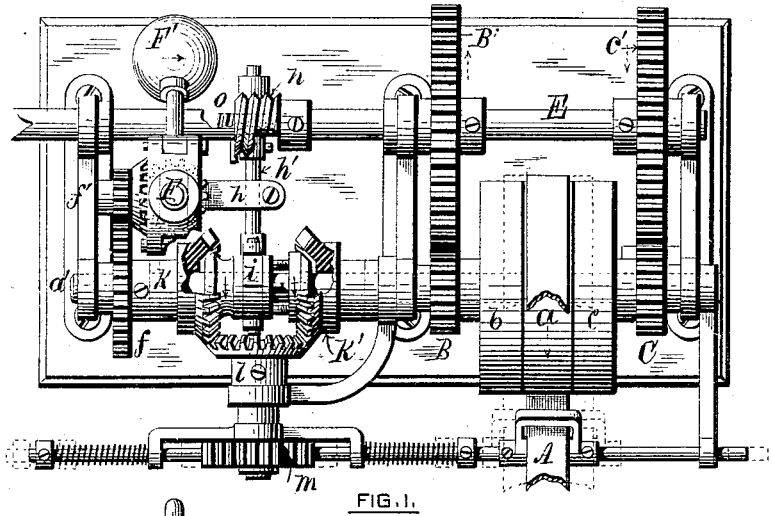
Figure 2:
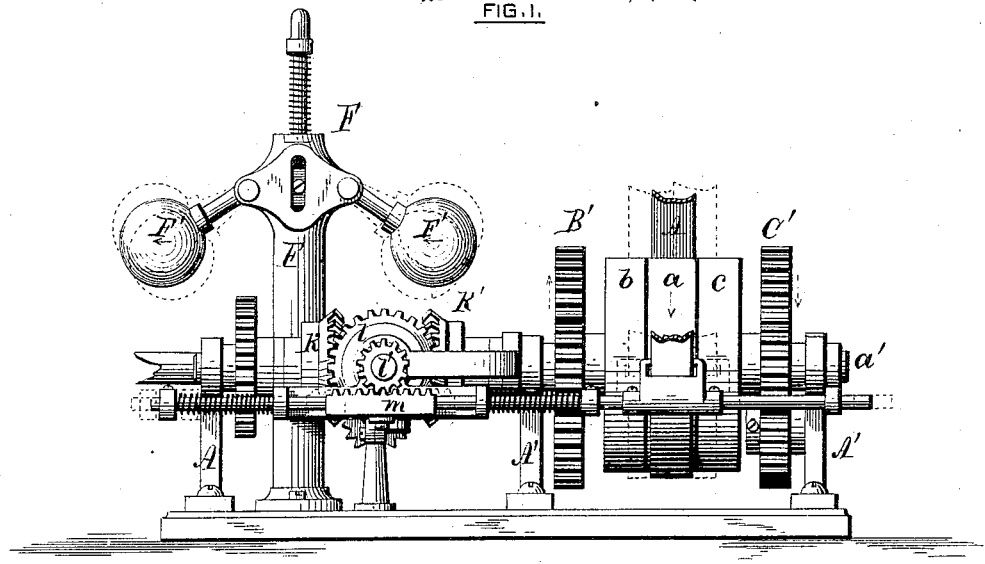
Figure 3:
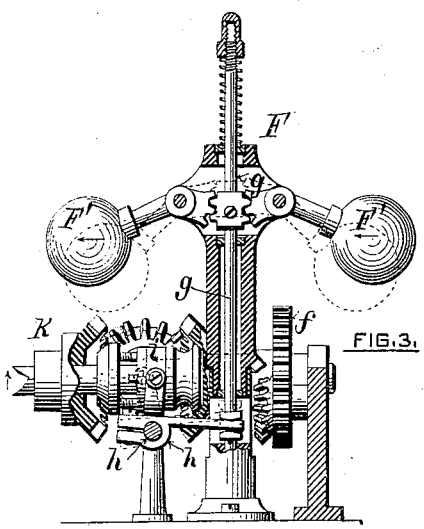

Figure 1 is a top view of my improved governor for water-wheels, one of the governor-balls being omitted to show the compound gear more clearly and partly in section, part of the gate-shaft being also broken away to show the worm-gear operating the clutch-shaft. Fig. 2 is a side view of the mechanism, showing the centrifugal governor, the pinion connecting with the rack on the belt-shipper, the belt, and the three driving-pulleys, as also the fixed gears for operating the gate-shaft. Fig. 3 is a sectional view of the centrifugal governor and its connection with the clutch and compound gear.

In the drawings, A is an endless belt, which extends from a pulley on any shaft driven by the water-wheel to the pulley *a* on the governor mechanism and communicates motion to the same, so that the pulley *a* is constantly driven, and as the same is mounted in the standards A', and is connected directly by means of fixed gears, more fully described hereinafter, with the centrifugal governor, the same is driven from the water-wheel, so that it will turn relatively at the same speed as the water-wheel— that is to say, any change in the speed of the water-wheel causes a change in the speed of the centrifugal governor.

*b* is a pulley placed close to the pulley *a*. It is mounted, with the pinion B, on a sleeve turning on the main shaft, and the pinion B gears into the gear B', secured to the gate-shaft E. On the other side of the pulley *a*, and also close to the same, is the pulley *c*, also mounted on a sleeve on which the pinion C is secured, and which gears through an intermediate pinion into the gear C', secured to the gate-shaft E. The pulleys *a*, *b*, and *c* are of the same diameter, and to facilitate the ready shipping of the belt they are preferably made with straight instead of crowning faces. As long as the belt is maintained on the central pulley, *a*, the pulleys $b$ and $c$ will remain stationary and only the centrifugal governor will be driven. As soon, however, as a portion of the belt A passes onto the pulley $b$, as is indicated in broken lines in the drawings, the pulley $b$ will turn with the pulley $a$ and the pinion B will turn the gear B′, and with it the gate-shaft E, in one direction, either to open or close the gate, (as shown in the drawings it will open the gate,) and will continue to open the gate as long as the belt is partly on the pulley $b$. If, now, the belt is moved partly onto the pulley $c$, the same will rotate with the pulley $a$ and the pinion C will turn the gear C′ through the intermediate gear, and with the same the gate-shaft in the opposite direction, (in this case to close the gate,) and will continue to do so until the belt A has returned to the central pulley. As long, therefore, as the belt turns the central pulley, $a$, only the gate will remain stationary; but when a portion of the belt extends over either the pulley $b$ or $c$ the pulley so connected will turn with the central pulley and turn the gate-shaft E either in one or the opposite direction. As the gate-shaft is connected with the gate by gearing, it is obvious that the turning of the gate-shaft must raise or lower, open or close, the gate.

To regulate the movement of the belt A through the variation in the speed, the shaft $a'$, on which the pulley $a$ is secured, and which shaft extends from one end to the other of the mechanism parallel with the gate-shaft E, is provided with the gear $f$, gearing into the pinion $f'$, on the shaft of which a beveled gear is fixed, gearing into a beveled gear on the column of the centrifugal governor F, thus imparting rotary motion to the governor F directly through fixed gears. The weighted and hinged arms of the governor rise and fall with the increase or decrease of the speed of its revolution, and as the inwardly-extending portions of the arms F′ F′ are connected with the central rod, $g$, this rod rises and falls with the rising and falling motion of the arms F′, as is indicated in broken lines in the drawings, Figs. 2 and 3. The lower end of the rod $g$ is connected with the arm $h$, which is clamped to the rock-shaft $h'$. To the same rock-shaft, $h'$, a fork is secured, the two ends of which are pivoted in a loose ring on the center of the double clutch $i$, which is secured to the shaft $a'$ by means of a groove and spline, so that while revolving with the shaft it is free to move longitudinally on the same.

$k$ and $k'$ are bevel-gears provided with sleeves, and turning loose on the shaft $a'$, and $l$ is a beveled gear secured to a shaft, on the other end of which the pinion $l'$ is secured, gearing into the rack on the belt-shipper rod M. The beveled gears, $k$ $k'$, and $l$ form the compound gear through which motion is communicated to the belt-shipper rod by means of the pinion $l'$. When the clutch $i$ is in contact with the beveled gear $k$ the belt-shipper will move the belt on the pulley $c$, and when the clutch $i$ is in contact with the beveled gear $k'$ the belt-shipper will be moved in the opposite direction, this compound gear being a well-known device for changing the direction of moving parts in machines.

Coiled springs are shown on the governor-rod $g$, and also on the shipper-rod. Such springs are used for the purpose of facilitating the return to the normal position of the devices.

The operation of the mechanism is as follows: When the water-wheel is running at the speed desired all the shafting connected with it will run at the desired speed. When, now, extra machinery is connected with the shafting, and thus an extra load is put on the water-wheel, the speed will be diminished and the gate will have to be opened to allow a larger quantity of water to pass through the wheel, and when machinery is disconnected from the driving-shafting the contrary effect is produced and the gate-opening must be diminished. When running at the desired normal speed the belt A is on the central pulley, $a$, and the balls of the governor F are at the point indicated in Fig. 2 in solid lines. When, now, the speed is increased the balls will rise, as is shown in broken lines in Fig. 2 and in solid lines in Fig. 3, the rod $g$ will depress the arm $h$ and turn the rock-shaft so that the clutch $i$ will engage with the gear $k$, and this will turn the gear, and with it the gear $l$ and pinion $l'$, which will move the rack and belt-shipper bar so as to bring the belt partly on the pulley $c$, and thus through the pinion C the intermediate gear and gear C′ will turn the gate-shaft E to close the gate. The quantity of water being diminished, the speed will slacken, the balls of the governor will fall, thus raising the arm $h$ and moving the rock-shaft until the clutch engages with the gear $k$, thus reversing the motion until the normal speed is again regained and the belt is running on the central pulley, $a$.

As the pulleys that turn the gate-shaft E to close the gate turn with the shaft on which they are supported and with the central pulley, the slightest lap of the belt on these pulleys will cause them to turn and operate the gate-shaft, so that even a small variation of speed will be quickly corrected. The mechanism is strong and the application of the power direct to the gate-shaft, while the governor is left free to act on the slightest change of speed, thus combining great sensitiveness with power to move the largest gate under any pressure of water.

The centrifugal governor shown is the ordinary form used; but any other form of governor may be used and connected with the clutch in the manner shown to produce the same result.

The worm $n$ on the gate-shaft E gears into the worm-gear $o$ placed on the rock-shaft $h'$. The worm-gear is provided with a pin, which engages with a projection on the rock-shaft $h'$. This device comes into use only when the gate-shaft E has been turned so many times in one direction that the gate would be wide open or nearly closed, in which case the pin on the worm-gear will partially turn the rock-shaft, disengage the clutch, and allow the belt to pass to the central pulley. It is a safety device which only comes into use when from any cause the belt-shipper device should fail to act promptly.

Having thus described my invention, I claim as new and desire to secure by Letters Patent—

1. In a governor for water-wheels, the combination, with a pulley for driving the centrifugal governor constantly, of two adjacent pulleys, each geared to the gate-shaft, so that one will turn the gate-shaft to raise the gate and the other to lower the same, the whole driven by a belt and controlled by the centrifugal governor, as described.

2. The combination, with a centrifugal governor connected with a clutch constructed to connect one of two idle-gears in a compound gear with a driven shaft, of a belt-shipper operated through the compound gear and constructed to lead a belt from a central pulley to either one of two pulleys placed on each side of the central pulley, such side pulleys being connected with the gate-shaft by gears, so as to turn the same in opposite directions to regulate the water-supply, as described.

3. The combination, with the gate-shaft E, provided with the gears B' and C', of the pulleys $a$, $b$, and $c$, placed side by side, the pulley $b$ being geared directly to the gear B' and the pulley $c$, through an intermediate gear, with the gear C', while the pulley $a$ is connected with the centrifugal governor and a belt-shipper device controlled by the centrifugal governor and constructed to guide the belt to operate the gate on a change of speed taking place, as herein described.

4. The combination, with a constantly-driven shaft and a centrifugal governor, of the compound gears $k$, $k'$, and $l$, a rack and pinion constructed to operate a belt-shipper, and intermediate means by which the motion of the belt-shipper is controlled by the centrifugal governor, the whole constructed to connect and disconnect the belt with pulleys connected by means of gears with the gate-shaft, so that a variation of speed of the water-wheel will be corrected by increasing or diminishing the gate-opening through means substantially as described.

5. The combination, with the pulley $a$ and belt A, constructed to drive a centrifugal governor, of the pulley $b$, connected by gears with the gate-shaft, so as to turn the gate-shaft in one direction, the pulley $c$, connected with the gate-shaft, so as to turn the same in the opposite direction, and mechanism, substantially as described, by which the belt is controlled from the governor and moved from one pulley to the other to control the gate on a change in the speed of the wheel, as described.

In witness whereof I have hereunto set my hand.

JAMES MORTON.

Witnesses:
J. A. MILLER, Jr.,
M. F. BLIGH.